United States Patent
Lorinser et al.

(10) Patent No.: US 6,484,221 B1
(45) Date of Patent: Nov. 19, 2002

(54) BUS EXTENSION FOR MULTIPLE MASTERS

(75) Inventors: Andreas Lorinser, Waldbroun (DE); Andre Wetzel, Radolfzell (DE); Andreas Bayer, Singen (DE); Pavel Novak, Schaffhausen (CH); Klaus M. Irion, Liptingen (DE)

(73) Assignee: Storz Endoskop GmbH (CH)

( * ) Notice: Subject to any disclaimer, the term of this patent is extended or adjusted under 35 U.S.C. 154(b) by 0 days.

(21) Appl. No.: 09/411,412

(22) Filed: Oct. 1, 1999

(51) Int. Cl.[7] .......................... G06F 12/00; G06F 13/22
(52) U.S. Cl. ...................... 710/200; 710/224; 710/220; 710/241
(58) Field of Search ................... 710/107, 108, 710/109, 110, 111, 113, 114, 115, 116, 117, 119, 120, 121, 122, 123, 124, 309, 200, 220, 240, 241

(56) References Cited

U.S. PATENT DOCUMENTS

| | | | |
|---|---|---|---|
| 5,237,696 A | * 8/1993 | Best ........................... 710/119 |
| 5,627,584 A | * 5/1997 | Nishikori et al. ............. 348/72 |
| 5,721,737 A | * 2/1998 | Radjabi et al. ............. 370/449 |
| 6,397,286 B1 | * 5/2002 | Chatenever et al. ........ 710/302 |

FOREIGN PATENT DOCUMENTS

| | | |
|---|---|---|
| EP | 0 355 042 A2 | 2/1990 |
| EP | 0 567 354 A1 | 10/1993 |
| WO | WO 94/23375 | 10/1994 |
| WO | WO 9522363 | 8/1995 |

\* cited by examiner

Primary Examiner—Peter Wong
Assistant Examiner—Tim Vo
(74) Attorney, Agent, or Firm—St. Onge Steward Johnston & Reens LLC

(57) ABSTRACT

A network bus for interconnecting a plurality of medical devices is described in which the devices are provided with modules adapted to communicate along the bus. Some of the devices are capable of assuming control over the bus with network master modules. A self-configuring capability is provided with which several network master capable medical devices automatically determine which network master is to take over control over the network bus and each individually is capable of controlling and operating the network. Each network master capable device has an extended network management module with which automatic master selection is achieved. This is done by monitoring or observing network communications for particular objects. Once such an object has been detected, a network master capable device is automatically selected to take over control on the basis of its priority. The selected network master module in turn monitors the network bus for objects indicative of another medical device which has a higher priority, while other connected master network capable medical devices continue to monitor the network bus to detect whether the current master is de-activated or fails to operate as master. The extended network module thus automatically enables another network master capable device to take over control over the network bus.

14 Claims, 10 Drawing Sheets

BUS EXTENSION FOR MULTIPLE MASTERS

This invention generally relates to a bus used to control and connect various medical endoscope related devices used in an operating room environment such as can be encountered in hospitals, clinics and doctors offices. More specifically this invention relates to a method and apparatus for accommodating and connecting devices having different network master capabilities to a bus in a seamless and reliable manner during use of the network and bus in a surgical procedure.

BACKGROUND OF THE INVENTION

In a co-pending patent application entitled "System For Centrally Monitoring and/or Controlling At Least One Unit" filed by D. Chatenever, K. Irion, P. Novak and H. -Uwe Hilzinger with Ser. No. 09/180,692 on Nov. 11, 1998 and owned by the same Assignee as this application, a bus for connecting various medical devices for a surgical procedure is described. In one embodiment in this application, devices having different network mastering capabilities is described. The device having the network master capability with the highest priority is assigned to control the network and bus so that only one device will serve as a network master.

The bus described in this co-pending patent application is a modified CAN (Controller Area Network) bus used in automotive and industrial applications. The CAN bus is suitable for real-time operation and permits a multi-tasking master structure.

Publications relevant to central monitoring and/or controlling endoscopic devices are known such as from the European Patent EP 0 319 762 A1 or its German equivalent DE 37 41 833 C1, U.S. Pat. No. 5,627,584, the International patent WO 95/22363, the Japanese Patent A-62-46182 and the German Utility Model U1 92 18 173. The devices described in these systems are connected and controlled by a master computer via an interface such as described in the above EP '762 patent or via a network as described in the above '173 utility model. EP 0 568 081 A1 relates to the examination and/or treatment of eyes.

In a modular communication system for central and sterile operation of medical devices such as endoscopes, endoscopic cameras, insulators irrigators and suction devices and the like, their connection to, or disconnection from, a network may occur throughout a surgical procedure. Some of the devices have network master capability and others are slaves under the operation and control of the network masters. The network masters must do the network configuration and monitoring as well as control. The network master capable devices can, furthermore, have different network mastering capabilities built into them. It is, therefore, important that the engagement of a network master capable device with the network occurs in a seamless manner without interrupting an on-going use of a medical device and thus impart a high level of reliability to the network and the surgical equipment. This becomes particularly important when the network extends across a wide area encompassing different operating locations where various medical procedures may be simultaneously in progress with different patients.

SUMMARY OF THE INVENTION

With a network mastering system in accordance with the invention medical devices having network master capabilities built into them can be conveniently connected to or disconnected from a communication network used to interconnect the devices and an automatic network configuration can be established.

This is achieved in accordance with one technique of the invention by employing a bus communication layer that is coupled to various devices as the case may be. A multimaster processing module, that can be identified as the XNM module for "Extended Network Management", is incorporated to enable the communication layer to automatically re-configure itself in accordance with the network master associated with the medical device that has the highest priority.

It is, therefore, an object of the invention to provide an automatic master selection module for use with a communication layer associated with a bus in a network that connects to or is coupled to various medical devices used in a medical procedure.

It is a further object of the invention to provide a method for selecting one of a multiple of network masters to operate and control communications over a network system connected to medical devices used in a medical procedure.

These and other advantages and objects of the invention can be understood form the following detailed description of a master selection module in accordance with the invention and described in conjunction with the drawings.

DETAILED DESCRIPTION OF THE DRAWINGS

Figure 1:
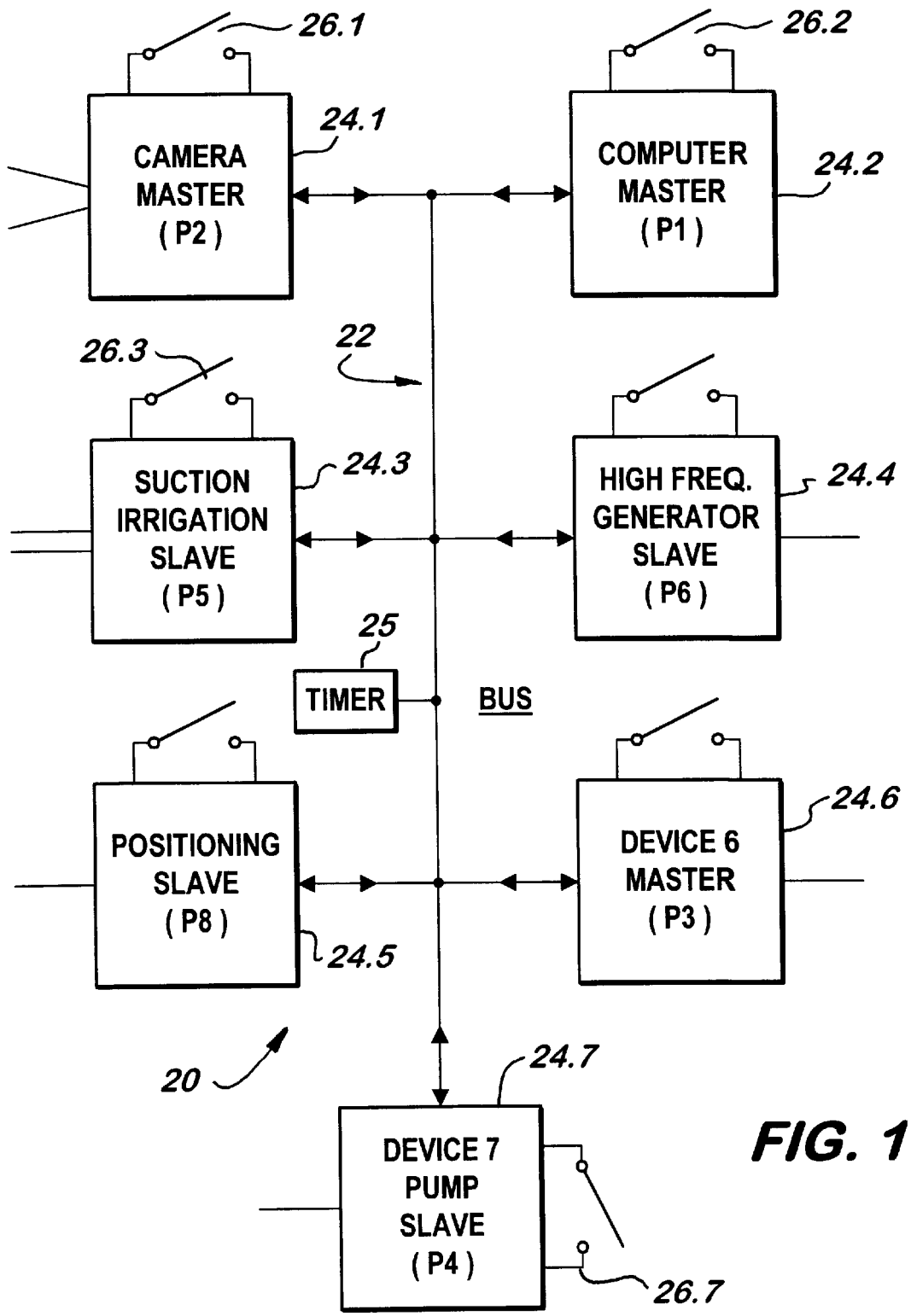
FIG. 1 is a block diagram view of one network bus system coupled to various medical devices used in a medical procedure.

With reference to FIG. 1 diagrammatic view of a network connected system 20 is shown, formed of a bus 22 coupled to a variety of different medical devices, also referred to as nodes, such as an endoscopic camera 24.1, a computer 24.2, an irrigation device 24.3, a high frequency generator 24.4 and others. The use of a number on the right side of a decimal point refers to specific items and the number on the left side of the decimal point refers to devices in general. Some of these devices 24 have network master capability, such as 24.1 and 24.2 and others are slaves such as 24.3 and 24.5.

These devices 24 are shown coupled to a bus 22 but need not be actually connected to the bus at the same time and may be connected at later times in any sequence as appears desirable to the medical operator of system 20. For this reason the devices 24 are each shown provided with a switch, such as 26, to suggest that a device may be either connected to or disconnected from the network system 20. It should be understood that a switch 26 might not actually be employed but instead a device 24 can be connected to network 20 with suitable cables or is connected permanently and called into action from a standby mode. A timer 25 is shown as connected to the bus, though the timer is typically associated within the network master in control of network system 20.

The bus 22 may be formed with wires or include wireless channels such as provided with either rf or infrared type communications. The devices 24 are referred to as medical devices because of their respective connectability to the network system 20. It should be recognized, however, that a device, such as a computer 24.2 might be useful for other purposes and is called a medical device by virtue of its particular adaptation to work with network 20 and/or control of other medical devices 24.

As explained in the aforementioned co-pending patent application the medical devices 24 are provided with suitable electronics with which a connection to the network system 20 can be implemented. This electronics includes signals, or data representative of an identification code, such as the serial number of the medical device, the device type, and a priority code. The priority code defines a priority status for the device relative to other medical devices 24. Another code is included to enable other devices to determine whether or not the device has a network master capability.

Figure 2:
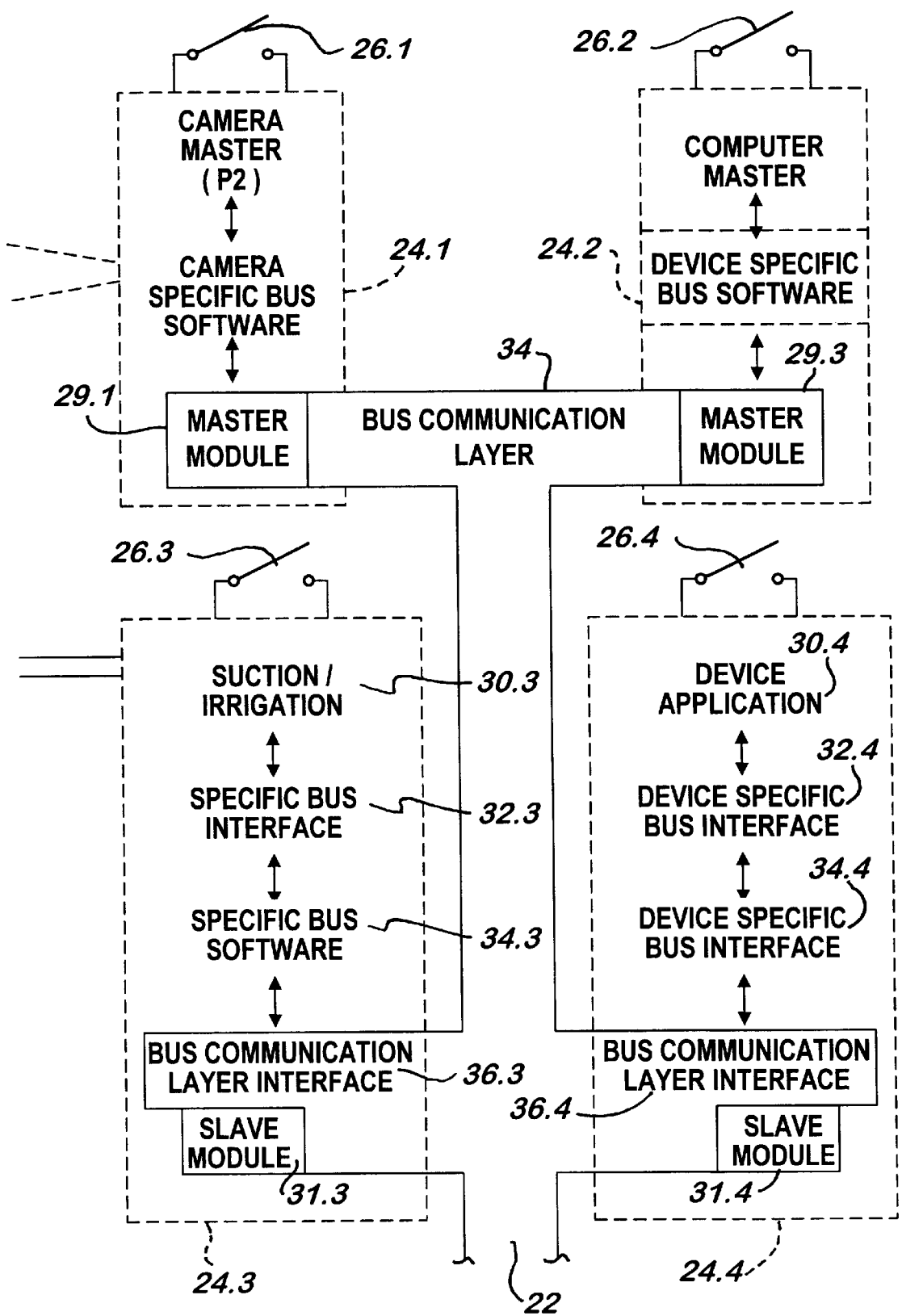
FIG. 2 is a partial and more detailed block diagram view of the network system shown in FIG. 1.

In FIG. 2 the bus 22 is shown with greater detail. Each medical device 24 having network master capability has a module 29 with which the device having the highest priority can assume control over the network or when disconnected therefrom enables another device to take over network control. Similarly, devices 24 having a slave status have a slave module 31, which responds to signals from a network master module 29. These modules 29 and 31 can be specific devices, but preferably are formed of software.

Communication with and control over devices 24 can be implemented using the hardware and software elements. For example, the suction medical device 24.3 has application specific software 30.3, a device specific interface 32.3, special software 32.3 to communicate with bus communication layer 34 through a bus communication layer interface 36.3. The bus communication layer 34 is as described in the co-pending patent application using a modified CAN bus system which interconnects, either by hard wires or with another medium such as infrared, with the other medical devices that are a part of the network system 20.

With the network system 20 it is possible to utilize electronics within various medical devices 24 connected to the same bus 22 while only one serves as a network master. The network master then controls all other medical devices. An automatic re-configuration of the network 20 may occur when a medical device having network master capability is brought on-line. The network masters are, therefore, provided with particular priority codes with which they can determine as to which master is to take over or cede control over a network 20 with respect to other network master-capable medical devices 24. Each network master capable device 24 has the attributes of that of any other with the difference being primarily as to the priority level accorded to that device.

Figure 3:
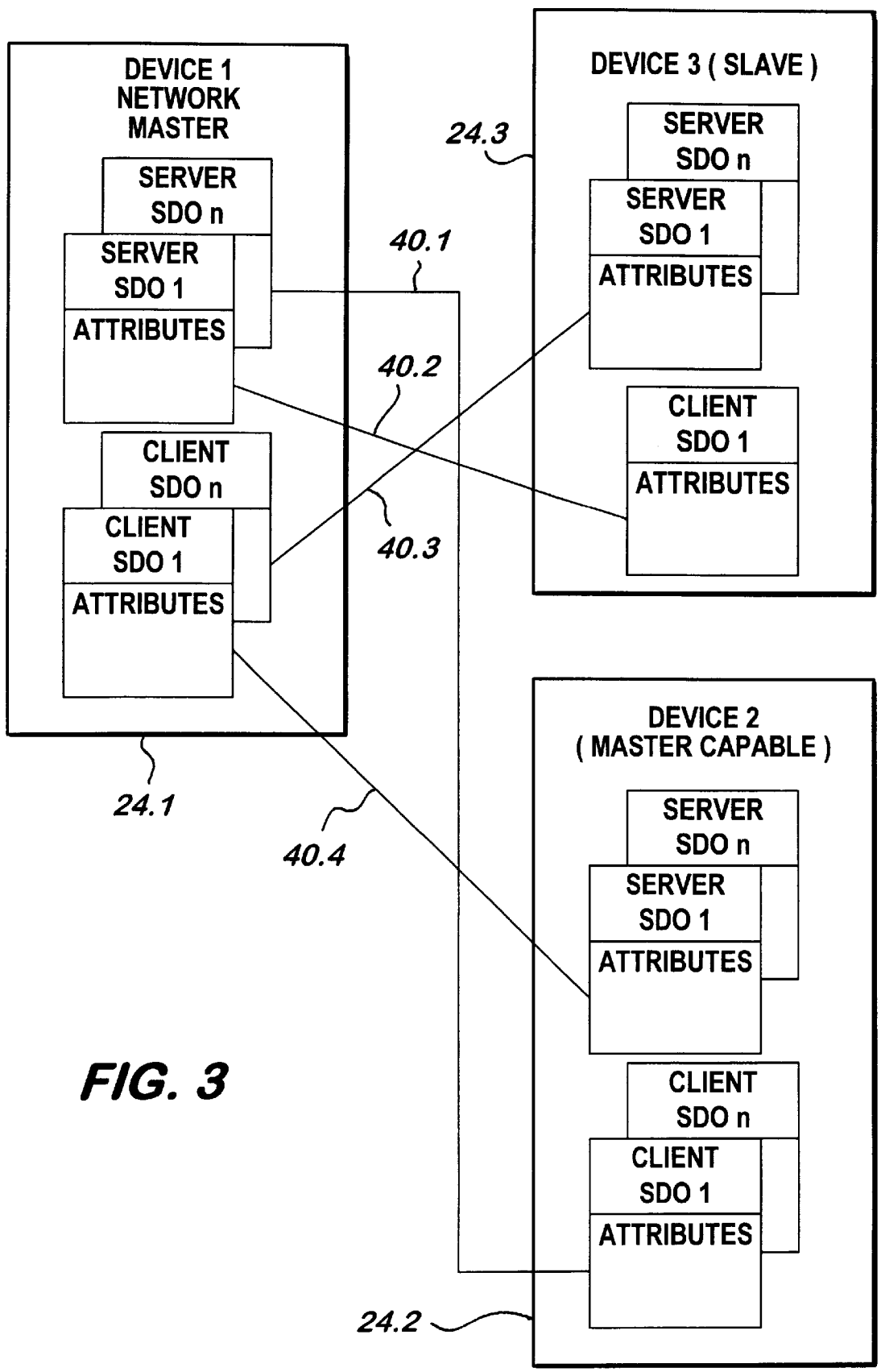
FIG. 3 is a diagrammatic view of an example of communication links possible with a network master selection module in accordance with the invention and used in the communication layer of the network bus system of FIG. 1.
Figure 4:
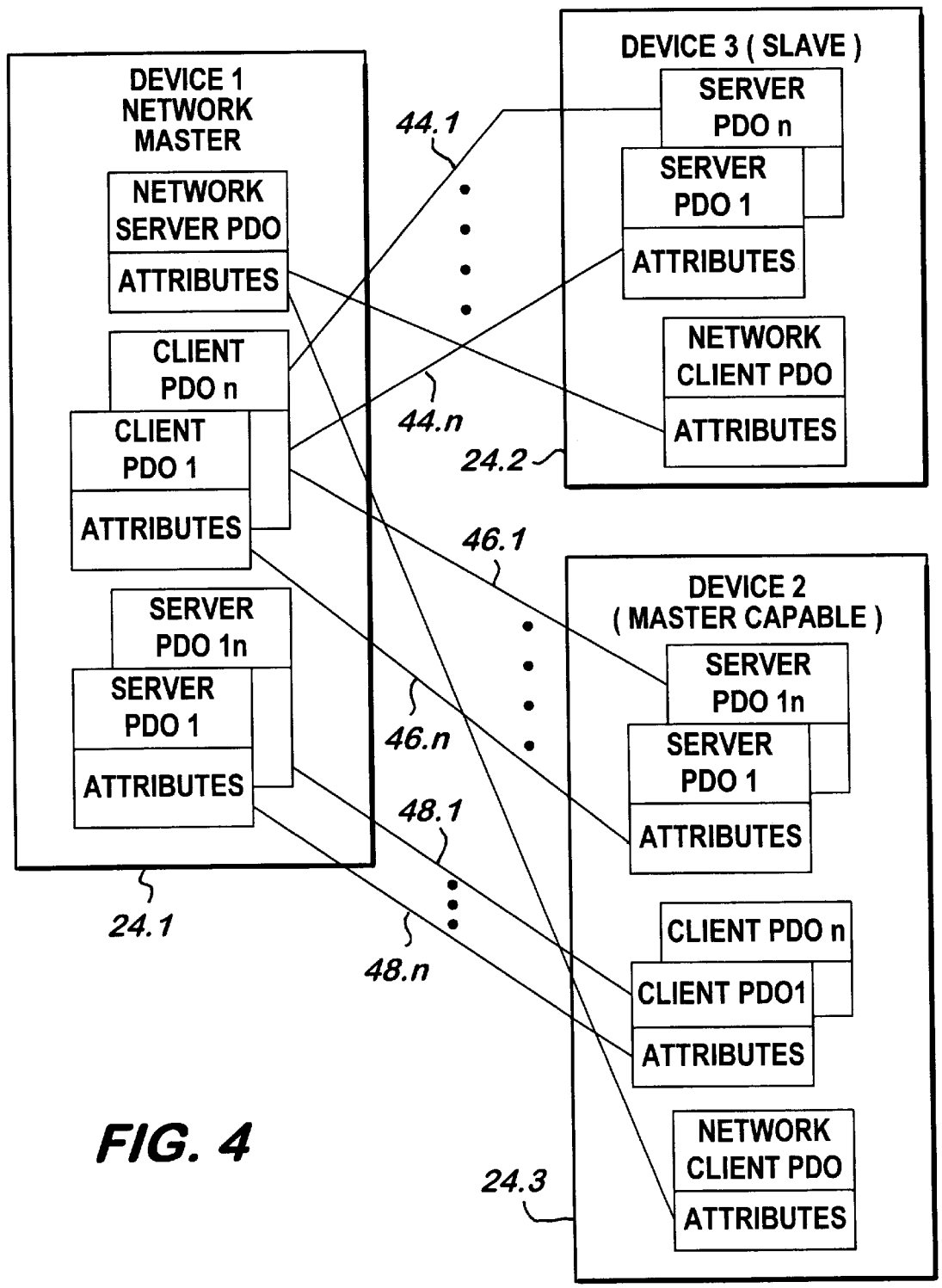
FIG. 4 is a diagrammatic view of another example of communication links with the network master selection module used in the communication layer of FIG. 1.

FIGS. 3 and 4 are illustrative of the nature of signals generated by the medical devices or nodes 24. Thus, medical device 24.1 stores service device objects, SDO's, from other devices 24 and stores their respective attributes as suggested by lines 40.1, 40.2, 40.3 and 40.4. The same is done in medical device 24.2 having a network master capability. In essence, all devices or nodes 24 send an "Indication object" of their ID's upon receipt of cyclically sent "Invitation object" signals from a network master. The Invitation objects and the "Indication" objects include the serial number, the device type and the priority of the node related to respective medical devices 24 and for devices with network master capability a binary code to that effect.

Similarly, process data objects, PDO's, are sent between the medical devices as representative of the data generated by the medical devices and being managed by the network master. Lines 44, 46 and 48 in FIG. 4 are suggestive of these communications through the communication layer 22.

Figure 5:
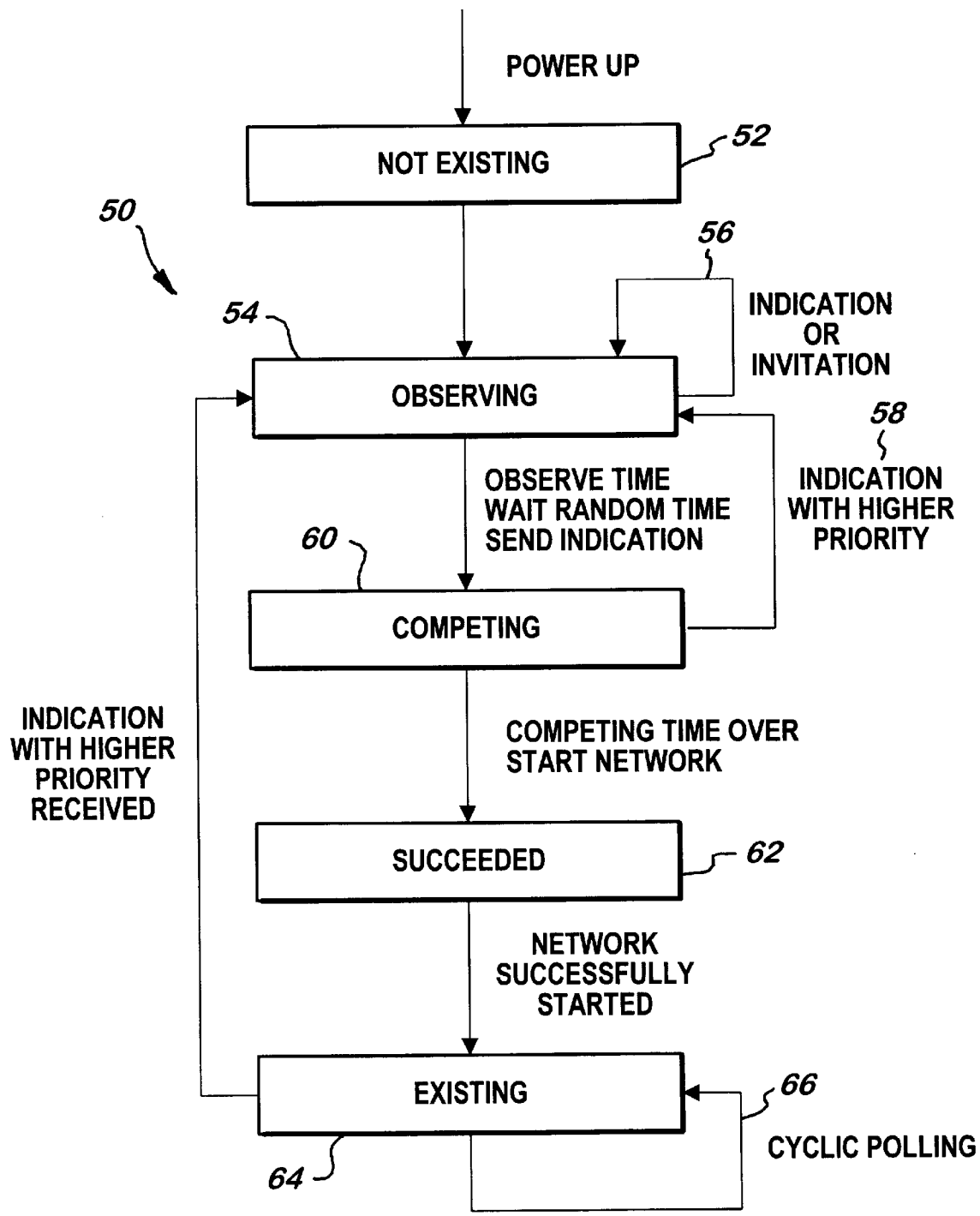
FIG. 5 is a flow diagram of successive steps used in a network master selection module in accordance with the invention.

FIG. 5 illustrates a network master module 29 and at 50 the states through which a master capability node or medical device 24 passes during a master specification phase. If a particular node does not possess master capability, it will remain in the so-called NOT EXISTING status at 52 with regards to its functionality. Following the initialization phase, a master capable node will initially monitor the bus 22 for a certain time period during an OBSERVING phase at 54, in order to find out whether another network master already exists at the bus 22. Such presence is determined from the transmission of repeated invitation objects from the network master in control of network 20.

If during this observation period 54 an Invitation object from an NMT master module is received requesting a module ID as at 56, then the receiving network master capable medical device will remain in the observing state. The receiving device will not initially try again to become a network master as long as the Invitation object from another master has a higher priority as determined at 58.

If during this observation period 54 it has not received a command from another master, the node commences a competing operation at 60 by outputting an "Indication" signal in the form of an object that includes information such as its device type, serial number and priority code. This Indication object is sent to all the other nodes 24 to signal its capability of assuming the master function. After that, it will again observe the bus 22 for a certain time period. This procedure is repeated once more, thus ensuring that, if there is more than one master-capability node, the nodes concerned learn about each other's existence.

If the master-capable node does not receive any other master command even after having outputted its "Indication" object repeatedly, it will appoint itself as the network master at 62 and thus be in the SUCCEEDED status.

If, however, during the competing state 60, it receives an "Indication" object from another master-capability node, it will evaluate this "Indication" object. On the basis of the received master priority code included with the device type, the master-capable node will decide whether it will become master itself or accord priority to the other "network master"

node. If the other node possesses the same master priority, then the serial number will also be used for decision making with the higher serial number indicating a higher priority. The serial number associated with the respective network master capable devices, thus also represents an indication of priority level, but then with respect to those other network master capable devices which have the same basic priority code.

After a node has become network master, it will call up those network services needed to start the network operation, the EXISTING state at 64, such by sending cyclic transmissions of "invitation" objects at 66.

Those nodes, which have been subordinated in the master specification process, will continue to monitor the bus 22 at 54 so as to be able to assume the master function in case the current master fails. Beforehand, however, the master specification routine 50 must be executed again. The other master capability nodes will detect such failure by the fact that the normal cyclic invitation objects from the network master are missing.

The software timer 25, shown in FIG. 1, is used for forming the defined periods during the master specification routine. At the beginning of an observation period, the timer's value is accepted into a specified variable. Thereafter, the timer is interrogated at regular intervals, thus determining the time elapsed. Typically one observation period may last about 500 ms, though adjustable. This results in a particular master-capability node first observing the bus for about a second and then transmitting its indication twice within the following second for an overall time of about two seconds to become a network master.

When active, partial networks systems, 20, each having a master-capable node in control, are connected together, the respective active partial networks must be first deactivated before being connected together. This avoids a logic conflict.

Figure 6:
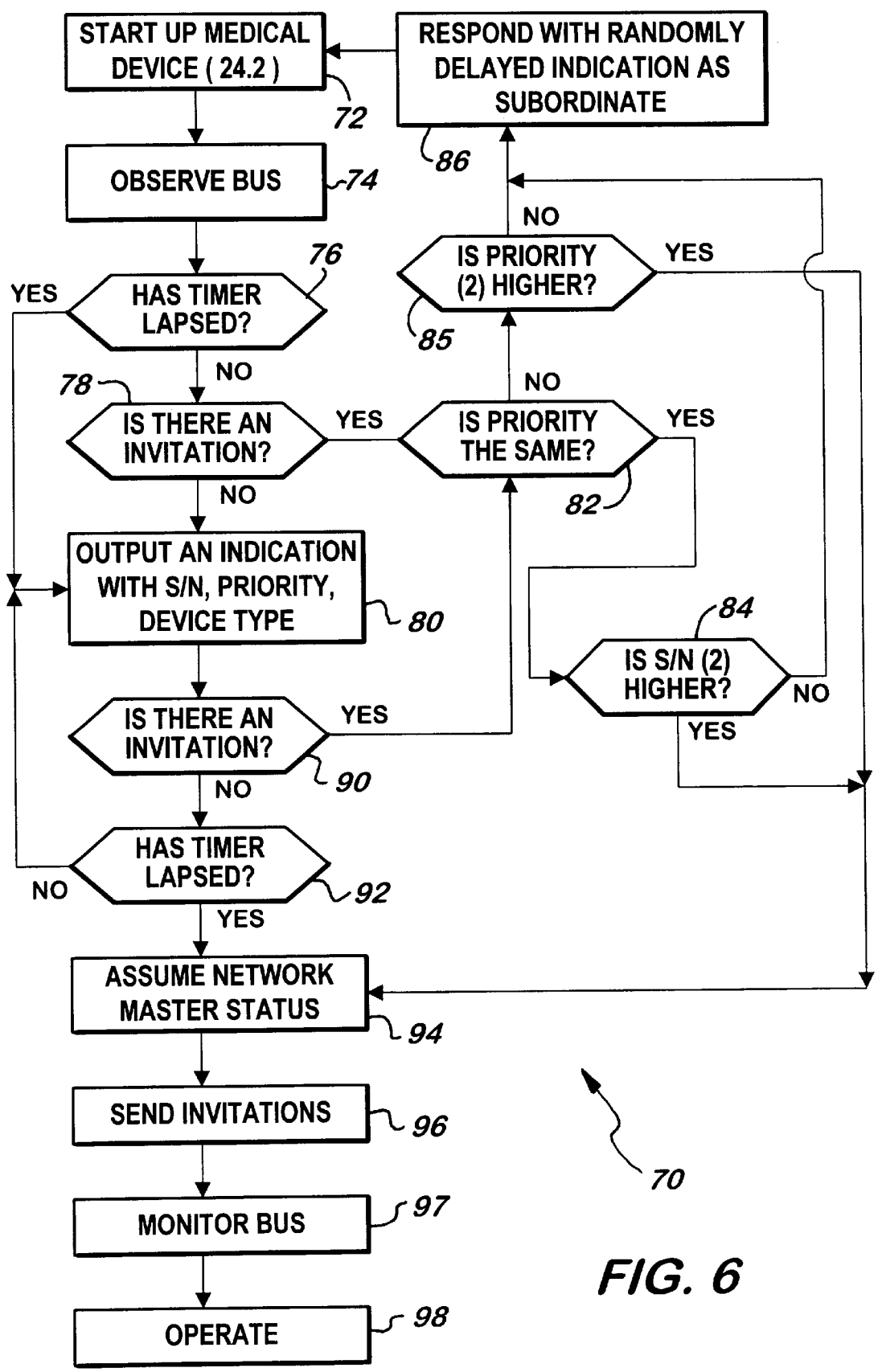
FIG. 6 is a more detailed flow diagram of the steps used in the network master selection module of FIG. 5.

FIG. 6 illustrates at 70 a module to implement network master capability with which selection of one of two different network masters 24.1 and 24.2 in accordance with the operations previously described is made. The portion of the module shown illustrates the technique which a network master capable module, 24.1, newly coupled to the network, undertakes to determine whether it should take over control of the network or not. The steps shown can be considered as logic elements formed as a result of software instructions or can be implemented with hardware.

Thus after the medical device 24.1 is started at 72 the activity on the bus 22 is monitored at 74. A timer, set during the observation period, is checked at 76 as to whether a particular time has lapsed. If not, a check is made at 78 whether an invitation object from a network master has been sent. If not, the device 24.1 puts out its own indication object at 80 including its serial number, priority and device type and the code identifying this module as having network master capability. These codes are typically incorporated as specific bits in a word sent along the bus 22 and recognized by devices 24.

If an invitation object from a network master was received at step 78, a check is made at 82 whether the priority of the current network master, 24.2, is the same as for device 24.1. If the same, then the serial numbers of the two devices 24.1 and 24.2 are compared at 84 and, for example, the device having the higher number is selected as the network master. If the priorities are not the sa me and if device 24.1 has a lower priority than that of the current network master as tested at 85 then an indication object associated with device 24.1 is returned at 86 with the identification code such as its serial number, its priority code and device type. This return of the indication object in effect subordinates the device 24.2 to the current network master device 24.1, which in turn checks the indication object returned to it for the presence of a network master capable device having a higher priority than itself.

Hence, the network master capable modules 29 for the various network master devices 24 are the same for all others and each thus in turn checks for the presence of a network master capable device 24 with a priority higher than itself from all the returned indication objects from all devices 24.

After an indication object was sent out at 80 the network master module in device 24.1 checks at 90 as to whether an invitation object has been sent by the current network master's module 29.1. If not, a check is made at 92 as to whether the timer state indicates that an invitation should have been sent and the device 24.2 assumes network master status and thus control over the network 20 at 94 if there was no invitation object. Control is exercised by sending out invitation objects at 96 and module 29.2 begins monitoring the bus 22 at 97 just as was done by module 29.1 for device 24.1.

The other side of the coin so to speak, resides with the network master module 29.1 in that it must have ceased sending invitation objects as soon as it identified, from a received indication object that originated with network master module 29.2, that the latter had a higher priority. This part of the technique in accordance with the invention is shown at 100 in FIG. 7 and for clarity next to FIG. 6. At 102 invitation objects are sent out at regular intervals onto the bus 22. Responding indication objects are detected at 104 and the priorities of the various devices are compared at 106 with the priority of device 24.1 and a device 24 with a higher priority is determined at 108.

As a result the network master module associated with device 24.1 ceases transmission of invitation objects at 110. This cessation serves to enable the steps 90 and 92 in technique 70 in FIG. 6 to make network master module 29.2 in FIG. 6 to assume control over the network 20 at step 94.

Figure 7:
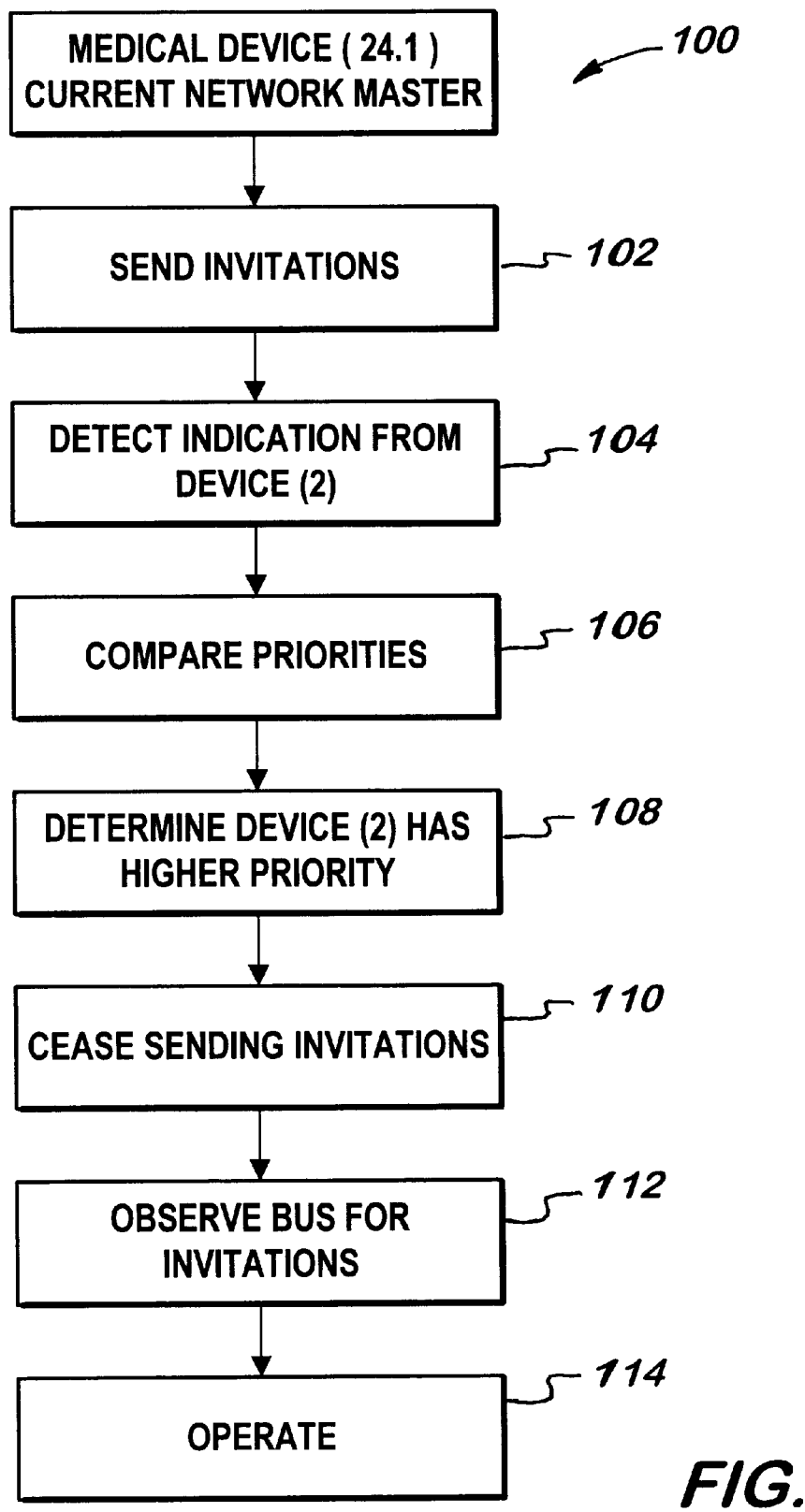
FIG. 7 is a flow diagram of the steps used in the network master selection module of this invention for handing of control to another module.

The network master module 29.1 in FIG. 7 is now subordinated to that in FIG. 6 and commences at 112 to observe the bus 22 for indication objects and invitation objects. The module 29.1 can thus resume network control whenever the network master module 29.2 in FIG. 6 is taken off the bus or in some other manner is no longer able to act as a network master. Both techniques 70 and 100 in FIGS. 6 and 7 respectively continue to operate at steps 98 and 114 using the communications as explained with reference to FIGS. 3 and 4.

Figure 10:
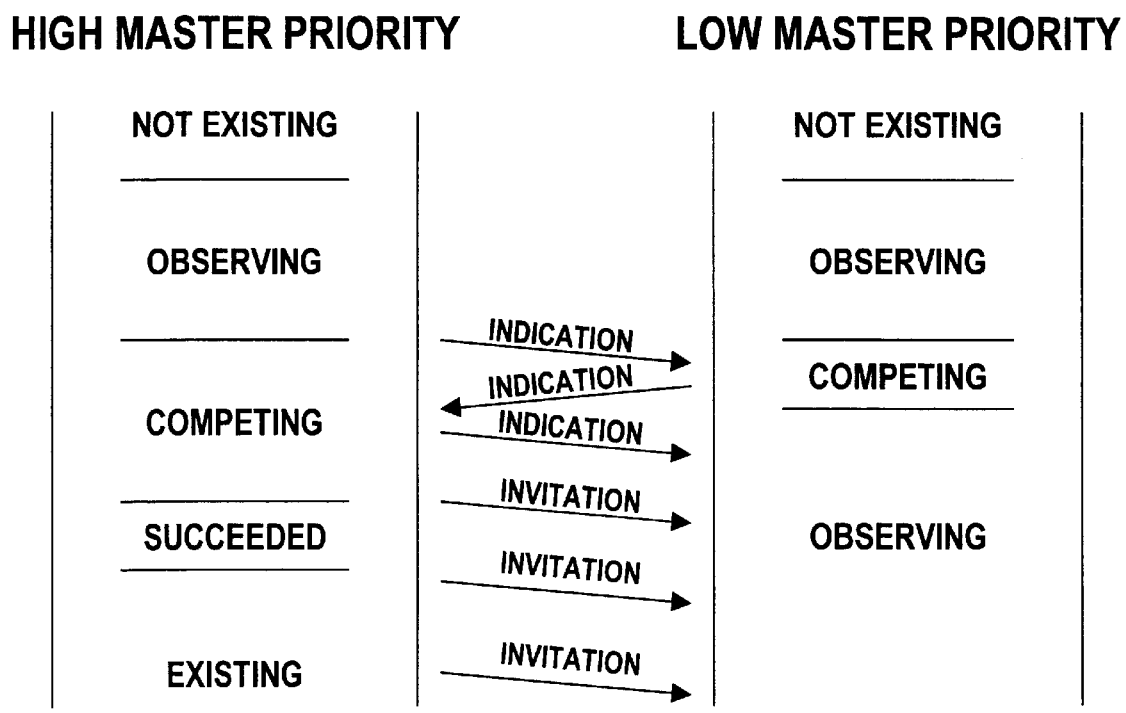
FIG. 10 is a process chart showing the transmission of objects along a network bus of this invention and between modules of network master capable devices to automatically select the device with higher priority for network bus control.

FIG. 10 further illustrates the procedures adopted for specifying a network master capable device when two master capable devices 24 are activated at the same time on bus 22.

Figure 8:
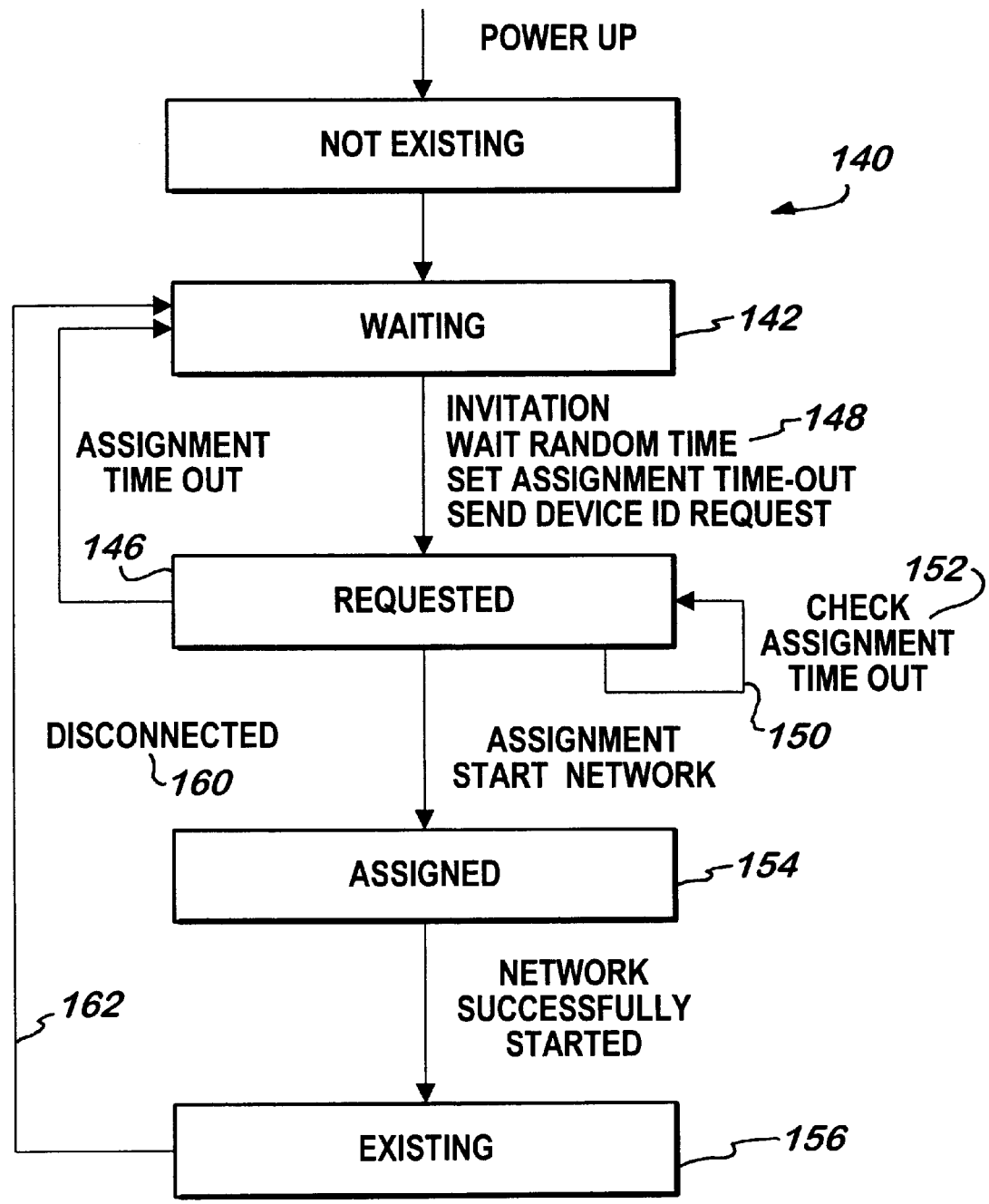
FIG. 8 is a flow diagram of steps used within the network master selection module to validate and test the status of the medical devices coupled to the network.

In FIG. 8 a slave module 31 is illustrated to show with a routine 140 the various individual states through which a slave module 31 passes before it has been given its module ID assignment by the NMT module 29. Hence, initially at 142 the network slave module 31 does not exist when an NMT master module 29 is activated. If a particular node, slave module 31, does not possess an NMT slave functionality then it will remain in the NONEXISTING status. Following an initialization phase, the NMT slaves 31 can only listen in to the bus in a waiting mode at 144.

When a slave module 31 receives an invitation object from the active master module 29, it sends a request at 146 for an identification code. This request is made after waiting a random time interval at 148 so as to reduce the chances for collisions of responses from various different slave modules trying to respond to the same invitation object. After this is done the slave module 31 is in the REQUESTED status and may not thereafter respond to an invitation object from the active NMT module 29 and is in a waiting mode as suggested with line 150. This waiting mode is provided with an appropriate time out function at 152.

In response to a received a module ID request, the NMT master module 29 looks for a free mule ID in its list kept for that purpose and enters the device code into the list and transmits this back to the slave module 31 concerned, together with the module ID that has been assigned and the new device 24 associated with slave module 31 that received the assignment can now be integrated into the network with its various services. This completes the assignment phase for the NMT master module 29. Once the slave module 31 recognizes the assignment code sent to it by the NMT master module 29 the slave module 31 is in the assigned status at 154 and can accept the services provided by the network. Once an NMT slave module 31 has reached the existing status at 156 it is fully integrated into the network.

Once a bus slave module 31 has been given its module ID by the active NMT module 29, the slave will insert this into its objects sent to other devices 24. In this manner, it is possible to operate more than one identical type of device 24 on the same bus 22.

In the event of a slave module 31 failure, i.e. if there is no response to requests addressed to it from the NMT master, the latter will remove this slave from its module list and its existence as to this master has lapsed. If the same NMT slave 31 is again added to the bus 22 at a later time, it must again request an assignment of a new ID.

When an NMT slave recognizes that it is no longer being guarded or receiving invitation objects from an NMT master, the slave 31 will disconnect itself as suggested at 160 and restart the routine 140 as suggested by the return line 162 for acquiring a module ID.

Figure 9:
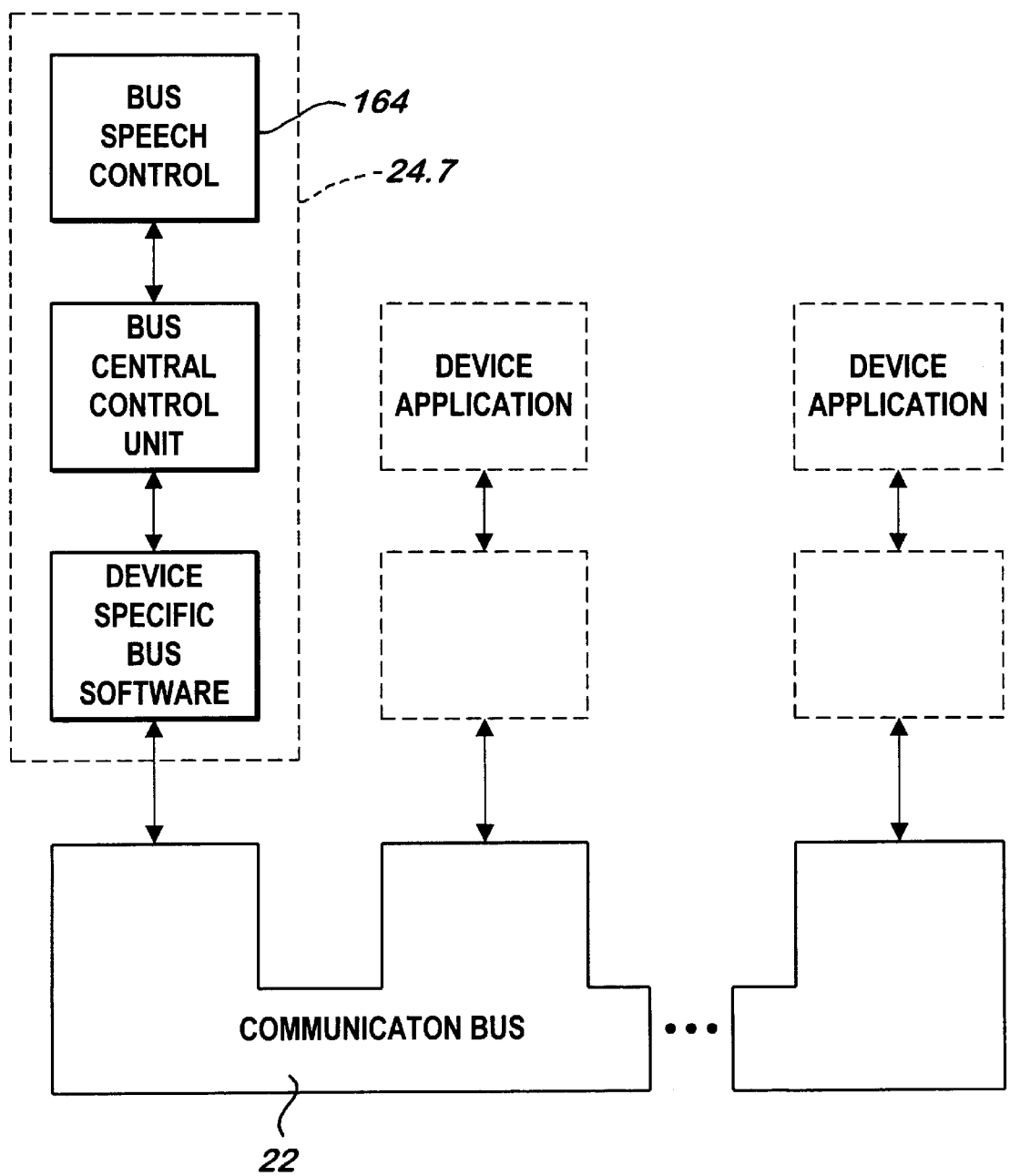
FIG. 9 is another block diagram view of a communication bus master selection system in accordance with the invention.

FIG. 9 illustrates the use of a network master capable device 24.7 with which spoken commands can be interpreted and carried out. The device 24.7 has for this reason sufficient priority status to maintain control over the local bus 22 as new devices 24 are activated on or disconnected from bus 22. Device 24.7 has a suitable speech recognition and control 164 for recognizing and implementing spoken commands.

Having thus described several embodiment for automatically handling of different network master capable devices as these are connected to or disconnected from the bus 22, the advantages of the invention can be appreciated. Variations from the described embodiments can be made without departing from the scope of the following claims.

What is claimed is:

1. In a bus for a network having a communication layer to which a plurality of medical devices are coupled with modules, wherein one or several of the modules has a network master capability with which control over and communication with other medical devices can be established and wherein the network master capable medical device is characterized by an identification code and a priority code with which its status relative to other medical devices coupled to the network is determined, the improvement comprising:

first logic elements in each said network master capable devices for generating invitation objects for transmittal to other medical devices connected to the bus;

a second logic element in each said network master capable devices to detect invitation objects from other network master capable medical devices;

a detection element in each said network master capable devices to derive priority levels associated with respective network master capable medical devices;

a comparator element in each said network master capable devices for determining which network master capable device has the highest priority level; and a switching logic element in each said network master capable devices to cease the transmittal of invitation objects from a network master capable device when an associated comparator determines that another network master capable device has a higher priority level.

2. The bus for a network as claimed in claim 1 and further including a random time delay generator element in each of said network master capable devices to randomly delay a response to a said invitation object to avoid collisions on said bus.

3. The bus for a network as claimed in claim 1 and further including a network master capable device having a speech recognition and control device located thereon for operation of the network.

4. The bus for a network as claimed in claim 2 and further including a plurality of medical devices having slave modules connected to said bus; said slave modules generating indication objects in response to invitation objects from a network master capable device.

5. The bus for a network as claimed in claim 4 wherein said slave modules each have a random time delay generator element to randomly delay a response to a said invitation object from a network master capable device to avoid collisions on said bus.

6. The bus for a network as claimed in claim 5 wherein each of said slave modules include a logic element to derive an identification assignment from a network master capable device prior to functional operation on said bus.

7. In a communication system connected to a network to which a plurality of medical devices are coupled with modules, wherein one or several of the devices has a network master capability with which control over and communication with the medical devices can be established and wherein the network master capable medical device is characterized by an identification code and a priority code with which its status relative to other medical devices coupled to the network is determined, the improvement comprising:

first and second network master modules respectively associated with first and second medical devices, said modules producing, when in control over the network, recurring invitation objects representative of invitations to other medical devices coupled to the network to send their respective identifications, priority statuses data;

said network master modules, when not in control of said network, repeatedly sending an indication object including an identification code, and priority code to the network master module which sent the invitation object;

said network master modules further each having first logic elements for determining which network master module has a higher priority and second logic elements to cease the sending of invitation objects when a network master capable medical device having a higher priority is detected;

said network master modules further including a third logic element with which the cessation of invitation objects is detected to enable assumption of control of the network by a master capable medical device;

whereby the network master module having the highest priority is automatically selected to control the network when several network master capable medical devices are coupled to the network or one is de-coupled from the network.

8. The communication system as claimed in claim 7 and further including a random delay generator in each of said network master modules and responsive to invitation objects from an active network master capable device to delay responses thereto and avoid collisions with responses from other medical devices connected to the network.

9. A method for operating a communication network bus to which a plurality of medical devices are coupled, wherein at least a first medical device has a network master capability with which control over and communication with medical devices on the network bus can be established and wherein the first medical device is characterized by an identification code and a priority code with which its status relative to other medical devices coupled to the network bus is determined, the improvement comprising the steps of:

generating invitation objects from said first device, said invitation objects including an identification code and a priority code associated with the first device;

transmitting, in response to a said invitation object, indication objects from a second network master capable device along the network bus to provide the first device with data indicative of the identification and priority of the second network master capable device;

terminating the transmission of said invitation objects from said first device when the second network master capable device has a higher priority than said first device;

generating invitation objects from said second network master capable device when said latter device fails to detect invitation objects from said first device.

10. The method for operating a communication network bus as claimed in claim 9 and further including the step of transmitting, in response to a said invitation object, indication objects from the medical devices coupled to the network at randomly selected times to provide the first device with data indicative of the identification and priority of the medical devices with reduced collision of indication objects on the network bus.

11. The method for operating a communication network bus as claimed in claim 9 and further including the step of terminating the transmission of said invitation objects from said first device when another of the medical devices has a higher priority than said first device;

enabling said one medical device to assume control over the network bus when said first device fails to transmit invitation objects.

12. The method for operating a communication network bus as claimed in claim 9 wherein said transmitting step further includes the step of sending identification codes having a value indicative of a predetermined priority.

13. The method for operating a communication network bus as claimed in claim 9 and wherein said first network master capable device monitors the network bus for invitation objects from said second network master capable device; and commencing a transmission of invitation objects from said first network master capable device when invitation objects from said second network master capable device have ceased.

14. The method for operating a communication network bus as claimed in claim 9 and further including the step of deriving from the network master capable device an identification code for respective medical devices connected to the network bus prior to their operating along the network bus.

* * * * *